United States Patent [19]

Grancio et al.

[11] 4,386,187

[45] May 31, 1983

[54] THERMOFORMABLE POLYMER BLEND COMPOSITION COMPRISING STYRENE POLYMER, OLEFIN POLYMER AND BLOCK COPOLYMER

[75] Inventors: Michael R. Grancio, South Hamilton; David F. Stewart, North Reading; John F. Cass, Wakefield, both of Mass.

[73] Assignee: Sweetheart Plastics, Inc., Wilmington, Mass.

[21] Appl. No.: 225,674

[22] Filed: Jan. 16, 1981

Related U.S. Application Data

[63] Continuation-in-part of Ser. No. 158,351, Jun. 11, 1980, abandoned.

[51] Int. Cl.$^3$ .................. C08L 53/02; C08L 55/02; C08L 25/06; C08L 25/08
[52] U.S. Cl. ............................. 525/96; 525/71; 525/98; 525/99
[58] Field of Search ................ 525/98, 88, 71, 96, 525/99

[56] References Cited

U.S. PATENT DOCUMENTS

| | | | |
|---|---|---|---|
| 2,755,270 | 7/1956 | Hayes | 260/45.5 |
| 3,010,935 | 11/1961 | Donald | 260/45.5 |
| 3,012,282 | 12/1961 | Donald | 18/47.5 |
| 3,018,263 | 1/1962 | Schneider | 260/45.5 |
| 3,210,301 | 10/1965 | White | 260/4 |
| 3,226,453 | 12/1965 | Arnold et al. | 260/876 |
| 3,265,765 | 8/1966 | Holden et al. | 260/876 |
| 3,299,174 | 1/1967 | Kuhre et al. | 260/876 |
| 3,444,267 | 5/1969 | Beer | 260/876 |
| 3,444,269 | 5/1969 | Beer | 260/876 |
| 3,445,543 | 5/1969 | Gruver | 260/876 |
| 3,452,120 | 6/1969 | Arnold | 260/889 |
| 3,459,830 | 8/1969 | Legge | 260/876 |
| 3,492,372 | 1/1970 | Flanagan | 260/897 |
| 3,514,417 | 5/1970 | Bickel et al. | 260/27 |
| 3,538,192 | 11/1970 | Bishop | 260/878 |
| 3,562,790 | 2/1971 | Coover et al. | 260/876 |
| 3,595,942 | 7/1971 | Wald et al. | 260/880 |
| 3,630,980 | 12/1971 | Russell et al. | . |
| 3,644,249 | 2/1972 | Ide et al. | 260/876 R |
| 3,665,059 | 5/1972 | Mahlman | 260/4 R |
| 3,689,597 | 9/1972 | Mahlman | 260/897 R |
| 3,810,957 | 5/1974 | Lunk | 260/876 B |
| 3,825,622 | 7/1974 | Robeson et al. | . |
| 3,835,201 | 9/1974 | Fischer | 260/897 A |
| 3,849,516 | 11/1974 | Plank | 260/876 R |
| 3,862,068 | 1/1975 | Russell | 260/829 |
| 3,868,433 | 2/1975 | Bartz et al. | 260/876 R |
| 3,873,643 | 3/1975 | Wu et al. | 260/878 R |
| 3,894,117 | 7/1975 | Agouri et al. | 260/897 A |
| 3,907,929 | 9/1975 | Durst | 525/88 |
| 3,947,536 | 5/1976 | Horiie et al. | 264/95 |
| 4,020,025 | 4/1977 | Zeitler et al. | 525/98 |
| 4,031,166 | 6/1977 | Bronstert et al. | 260/879 |
| 4,036,912 | 7/1977 | Stricharczuk | 260/897 A |
| 4,046,840 | 9/1977 | Carman et al. | 260/897 A |
| 4,075,285 | 2/1978 | Tabana et al. | 260/876 B |
| 4,076,669 | 2/1978 | Harper | 260/23.7 R |
| 4,098,734 | 7/1978 | Lee | 260/17 R |
| 4,101,050 | 7/1978 | Buckler et al. | 428/441 |
| 4,107,130 | 8/1978 | Gergen | . |
| 4,188,432 | 2/1980 | Holden et al. | 428/35 |
| 4,197,377 | 4/1980 | Bohm et al. | 525/98 |
| 4,208,315 | 6/1980 | Zweig | . |
| 4,239,673 | 12/1980 | Lee | . |
| 4,242,263 | 12/1980 | Lee, Jr. | . |
| 4,243,766 | 1/1981 | Abolins et al. | . |
| 4,302,554 | 11/1981 | Nabeta et al. | 525/98 |

FOREIGN PATENT DOCUMENTS

| | | |
|---|---|---|
| 658186 | 2/1963 | Canada . |
| 698750 | 11/1964 | Canada . |
| 2061361 | 12/1970 | Fed. Rep. of Germany . |
| 2201243 | 1/1972 | Fed. Rep. of Germany . |
| 2400659 | 1/1974 | Fed. Rep. of Germany . |
| 2356694 | 1/1978 | France . |
| 50-80285 | 6/1975 | Japan . |
| 957368 | 5/1964 | United Kingdom . |
| 1031132 | 5/1966 | United Kingdom . |
| 1114338 | 5/1968 | United Kingdom . |
| 1283213 | 7/1972 | United Kingdom . |

OTHER PUBLICATIONS

Bailey et al., *Rubber Age*, vol. 98, 69 (Oct. 1966).
Van Breen et al., *Rubber and Plastics Age*, vol. 47, 1070 (1966).
Zelinski et al., *Rubber Chem. and Tech.*, vol. 41, 161 (1968).
Holden, *Journal of Elastoplastics*, vol. 2, 234 (Oct., 1970).
Holden et al., "Block and Graft Copolymerization", Chapter 6, pp. 133-191.
Holden et al., "Thermoplastic Elastomers", publication of the Shell Chemical Company.
Paul, "Interfacial Agents ('Compatibilizers') for Polymer Blends", (Chapter 12), taken from Polymer Blends, vol. 2 (1978).

*Primary Examiner*—Carman J. Seccuro
*Attorney, Agent, or Firm*—Birch, Stewart, Kolasch & Birch

[57] ABSTRACT

A thermoformable polymer blend composition comprising at least 50% by weight of an olefin polymer such as polyethylene or polypropylene, from 10 to 48% by weight of a styrene polymer and from 2 to 40% by weight of a thermoplastic styrenic block copolymer rubber, preferably a styrene-butadiene-styrene block copolymer, which acts as a compatibilizer for the olefin and styrene polymers in the blend. This blend can be formed on conventional machinery to give products having the beneficial properties of both types of polymers.

6 Claims, No Drawings

THERMOFORMABLE POLYMER BLEND COMPOSITION COMPRISING STYRENE POLYMER, OLEFIN POLYMER AND BLOCK COPOLYMER

CROSS-REFERENCE TO RELATED APPLICATION

This application is a continuation-in-part of copending application Ser. No. 158,351, filed on June 11, 1980, now abandoned.

BACKGROUND OF THE INVENTION

This invention relates to a polymer blend comprising a polyolefin such as polyethylene or polypropylene as the major component, a styrene polymer as a secondary component and a suitable compatibilizer therefor. More particularly, the invention relates to polymer blends which have a combination of useful properties including thermoformability, resistance to fats, ductility, low temperature impact strength, printability, relatively low cost and other characteristics which make them attractive materials for use in many applications such as packaging, plastic dinnerware, non-packaging containers, refrigerator liners, etc. The blends may be shaped into such final products by any of the known thermoplastic forming techniques such as injection molding, thermoforming, stamping, forging, solid phase forming, rotary molding or the like.

Processes for shaping or molding plastic sheets into various useful articles by forming heated thermoplastic materials over cavities and having the sheet take the shape of the cavity have been known for some years. Most commercially available machinery for such processes is designed in such a way that the thermoplastic sheet is fed through an oven and heated to bring it to a thermoformable temperature. The sheet is heated to a softening point and then advanced to a forming station. Other machines have been developed which condition the sheet directly from the extruder to the proper thermoforming temperature by means of a series of rolls, which can either be heated or cooled. In either case, the forming station is outfitted with molds of the desired shape, and the heated thermoplastic material is either draped over the male mold or formed into the female cavity, thus taking on the shape of the predetermined design. Depending upon the detail of the part being made, the forming machine can be equipped with processing assists such as vacuum and/or air pressure and/or plug assists and/or match molds.

Among the low-cost thermoforming plastic resins, polystyrene (usually impact-modified polystyrene) is the most commonly used resin because it is easy to process. Impact polystyrene grades also exhibit good impact strength and low temperature qualities. In most commercial thermoforming units, the polystyrene sheet is heated outside of the thermoforming station to its softening or melting point and then advanced into the station for the thermoforming process. Styrene polymers, in contrast with the olefin polymers, have a wide range of thermoformable temperatures and can easily be brought up to the thermoforming temperature without appreciable sag and then advanced to a thermoforming station in a relatively stable condition.

However, by contrast, olefin polymers such as polyethylene, polypropylene or ethylene-propylene copolymers have a relatively sharp melting point and, thus, when heated outside of the forming station to a thermoformable temperature, a sheet thereof will not support its own weight and will sag, making it extremely difficult to advance the sheet into the thermoforming station. Therefore, thermoforming of materials such as polypropylene or polyethylene is sufficiently difficult that it is not practical on conventional equipment.

Nevertheless, olefin polymers such as polypropylene and polyethylene have many attractive properties and, hence, it would be a great advantage to be able to process these polymers on conventional thermoforming equipment. The cost advantages of thermoforming over injection molding are well known to those experienced in polymer processing. Therefore, certain processes have been developed in the art wherein polypropylene is heated to a temperature below its crystalline melting point, i.e., the sheet is heated to a temperature below the point where it will sag, and then it is transferred into the thermoforming press or station. The forming press thus contains a sheet of polypropylene that has been partially heated to a temperature below its softening point and, as a result, is somewhat stiff for conventional forming apparatus. Hence, it is necessary to use a press which exerts considerable pressure so as to be able to form the polypropylene sheet into the desired detail part since it has not been heated to its normal thermoforming temperature. This is known as the solid phase forming process.

Other proposals have been advanced in the art for the use of certain expensive, specialized machinery designed to thermoform olefin polymers in view of their sharp melting point, such as rotary machines.

The present invention takes into account all of these problems and provides a polymer blend or alloy which can be readily formed on conventional machinery. That is, the blends of the invention incorporate the basic beneficial properties of olefin polymers such as chemical and fat resistance, high temperature properties (in the case of polypropylene), room temperature ductility and relatively low cost with the desirable properties of impact styrene polymers such as impact strength, low temperature properties, thermoformability and stiffness. The major component in the polymer blends of the present invention is the olefin polymer, whereas most of the prior art teachings heretofore concerned the addition of a polyolefin to a styrene polymer base material in order to modify its properties.

Exemplary of such prior art is U.S. Pat. No. 4,031,166 of Bronstert et al, which describes an impact-resistant thermoplastic having a major portion (70–99% by weight) of a styrenic polymer, and a minor portion (from 1 to 30% by weight) of an alpha-olefin polymer, preferably polyethylene, but also including polypropylene, polyisobutylene and copolymers of two or more alpha-olefins, together with copolymers of vinyl aromatic and diene hydrocarbons. The result is a product which has the essential characteristics of polystyrene, but which also has some of the advantages of the other constituent material.

U.S. Pat. No. 3,810,957 of Lunk discloses a molding composition of high impact strength and good oxidative stability formed by physically blending 75 to 85 weight percent of a styrenic polymer and from 30 to 15 weight percent of a selectively hydrogenated block diene copolymer. U.S. Pat. No. 3,459,830 describes a polymeric composition having improved resistance to oxidation, weathering, ozone and solvents, and comprising a major portion (100 parts by weight) of a polystyrenepolybutadiene-polystyrene block copolymer and a minor portion (20 to 40 parts by weight) of polyethylene. In each of these compositions, the styrenic polymer is the dominant material.

SUMMARY OF THE INVENTION

One of the objects of the present invention is to provide thermoplastic compositions having process characteristics that are particularly advantageous in thermoforming operations.

A further object of the invention is to provide thermoplastic polymer blends or alloys which contain a polyolefin as the primary component and thus can be advantageously utilized in thermoforming, injection molding or other forming processes.

A still further object of the invention is to provide a thermoformable composition that combines the beneficial qualities of olefin and styrene polymers and which can be processed on conventional machinery.

These and other objects and advantages of the present invention will become apparent to those skilled in the art from a consideration of the following specification and claims.

In accordance with the present invention, it has been found that the above objectives can be achieved in a surprising and advantageous manner by providing a polymer blend comprising, as its main ingredients, a crystalline olefin polymer such as polypropylene or polyethylene, preferably polypropylene, and an amorphous polymer such as polystyrene, high impact polystyrene or styrene copolymers. The amount of polyolefin in the polymer blend is 50% by weight or more. The amount of styrene polymer in the blend is from 10 to 48% by weight as the secondary component thereof.

Since, as is known in the art, mechanical mixtures of such polymers are not compatible with each other when large proportions of polyolefin are used, a further feature of the invention is the provision of a suitable compatibilizer as a third component in the blend. The compatibilizer is employed in an amount of from about 2 to 40% by weight.

Such blends provide a high quality, high impact sheet product which can be readily thermoformed on conventional machinery without excessive sag. The components thereof can be mixed in any convenient manner, for example, pellets of each of the components may be homogeneously blended together by mere mixing prior to formation of sheet material. A preextrusion compounding step is not required.

Additives conventionally employed in the art, such as pigments, dyes, fillers, coloring agents and mineral oil, can be included in the blend, as desired. However, it is to be noted that the polymer blend of the invention provides an attractive opaqueness to the products formed therefrom without the use of any pigment, but, of course, pigment may be added depending on the desired result.

A particular feature of one of the embodiments of the invention is the capability of being able to use "regrind" material in the thermoforming process. During the processing operation, only a portion of the feed material used in the process is converted into useful products. The remainder goes into trim or waste. Such trim or waste can be reground and mixed with virgin feed stock.

The polymer blends of the invention include from 50 to 88% by weight, preferably about 54 to 82% by weight, of an olefin polymer as the major or primary component. Alpha-olefin polymers such as polypropylene or polyethylene are preferred. Polypropylene is particularly preferred. Ethylene-propylene copolymers can also be employed in the blend, as well as copolymers of ethylene and/or propylene with other suitable copolymerizable monomers. Examples of suitable polyolefins include low or high density polyethylene, polypropylene, polybutene-1, poly-3-methylbutene-1, poly-4-methylpentene-1, copolymers of monoolefins with other olefins (mono- or diolefins) or vinyl monomers such as ethylene-propylene copolymer or with one or more additional monomers, e.g., EPDM, ethylene/butylene copolymer, ethylene/vinyl acetate copolymer, ethylene/ethyl acrylate copolymer, propylene/4-methylpentene-1 copolymer and the like. The term "copolymer" includes polymers containing two or more monomeric constituents and substituted derivatives thereof.

From 10 to 48% by weight, preferably about 15 to 40% by weight, of a styrene polymer is employed in the polymer blends of the invention. Styrene polymers are, of course, well known in the art and include polystyrene and copolymers of styrene with suitable copolymerizable monomers. Examples thereof include polymers of monovinyl aromatic hydrocarbons such as styrene, acrylonitrile-butadiene-styrene (ABS), styrene-acrylonitrile (SAN), styrene-acrylic acid, styrene-methacrylic acid, styrene-maleic acid, alpha-methylstyrene and alpha-ethylstyrene; ring-substituted alkyl styrenes such as vinyl toluene, 3-methylstyrene, 4-methylstyrene, 4-isopropylstyrene, 2,4-dimethylstyrene, etc.; ring-substituted halostyrenes such as o-chlorostyrene, p-chlorostyrene, o-bromostyrene, 2,4-dichlorostyrene, etc.; ring-alkyl, ring-halosubstituted styrenes such as 2-chloro-4-methylstyrene, 2,6-dichloro-4-methylstyrene, etc.; vinyl naphthalene; vinyl anthracene; etc. The alkyl substituents generally have 1 to 4 carbon atoms and may include isopropyl and isobutyl groups. If desired, mixtures of such aromatic monomers may be employed. Commercially available styrene polymers, such as general purpose or impact polystyrene, can be advantageously employed.

The compatibilizer for the polymer blend composition of the invention must be suitably chosen such that it is capable of functioning as a compatibilizer for the olefin polymer-styrene polymer blend. Advantageously the compatibilizer is a block copolymer having both olefin polymer and styrene polymer compatibility characteristics. Styrene-butadiene, styrene-isoprene and styrene-ethylene block copolymers can be employed as the compatibilizer. Preferably the compatibilizer is a styrene-butadiene-styrene block copolymer.

The amount of compatibilizer to be employed in the polymer blends of the invention ranges from 2 to 40% by weight, advantageously from 2% to 20% and preferably from about 2 to 10% by weight. Most preferably, the amount of compatibilizer employed ranges from about 4 to 10% by weight.

Suitable compatibilizers to be employed in the present invention include elastomeric block copolymers which are prepared as described in U.S. Pat. No. 3,265,765 of Holden et al, which issued on Aug. 9, 1966, the disclosure of which is hereby expressly incorporated by reference. Further discussions concerning the properties, structure and characteristics of such block copolymers are contained in the following references:

Bailey et al, *Rubber Age*, Vol. 98, 69 (October, 1966)

Van Breen et al, *Rubber and Plastics Age*, Vol. 47, 1070 (1966)

Zelinski et al, Rubber Chem. and Tech., Vol. 41, 161 (1968)

Holden, Journal of Elastoplastics, Vol. 2, 234 (October, 1970)

Holden, "Block and Graft Copolymerization," Chapter 6, pp. 133–191

Holden et al, "Thermoplastic Elastomers," publication of the Shell Chemical Company The properties, structure and characteristics of such block copolymers are exemplified in Table 6.4 on page 147 of the Holden reference cited above, "Block and Graft Copolymerization" in Chapter 6 entitled "Properties and Applications of Elastomeric Block Copolymers", reproduced in part as follows:

low as about 1.4 as disclosed in Table 6.4 on page 147 of the Holden reference cited and discussed above.

As noted above, the resultant blend composition is characterized by a wide variety of excellent properties which appear to be wholly novel in polymer alloys incorporating a polyolefin as the major component. For example, the polymer blends of the invention possess thermoforming characteristics which enable them to withstand the temperatures that are necessary for conventional thermoforming of sheets without the detrimental sag deformation typically associated with polypropylene. Yet, the printability of the formed products is very high and requires little or no surface treatment. Moreover, the appearance of products made from the

TABLE 6.4

Composition and properties of elastomeric block copolymers.

| | Polymer number | | | | | |
|---|---|---|---|---|---|---|
| | 2 | 3 | 4 | 5 | 6 | 7 |
| A. Composition | | | | | | |
| Segmental molecular weights | 6S-81B-6S | 10S-53B-10S | 16S-52B-16S | 19S-31B-19S | 24S-25B-24S | 33S-18B-33S |
| % Styrene | 13 | 27.5 | 39 | 53 | 65 | 80 |
| Total molecular weight $\times 10^{-3}$ | 93 | 73 | 84 | 72 | 73 | 83 |
| B. Mechanical properties[a] | | | | | | |
| Initial modulus, p.s.i. | 275 | 585 | 2050 | 14,500 | 60,000 | 128,000 |
| Tensile strength, p.s.i. | 150 | 3350 | 3500 | 3000 | 2300 | 3700 |
| Elongation at break, % | 1000 | 1030 | 750 | 550 | 85 | 2.5 |
| Hardness, shore A[b] | 41 | 63 | 89 | 92 | 96 | 98 |
| C. Flow properties | | | | | | |
| Melt index, condition G (gm/10 min)[c] | 21 | 17 | 1.4 | 3.2 | 7 | 22 |
| Viscosity at a shear stress of $2 \times 10^5$ dynes/cm$^2$ (kilopoise)[d] and a temperature of 175° C. | 13 | 29 | 118 | 36.5 | 31 | 28 |

[a]Tensile specimens were cut from a compression moulded sheet using a die having a 1 in constructed length and extended at a rate of 2 in/min.
[b]ASTM D-2240-64T.
[c]ASTM D-1238-57T.
[d]A capillary rheometer manufactured by Instron Engineering Co., Canton, Massachusetts was used. The capillary had a length of 2 in and a diameter of 0.06 in.

The disclosures of each of these references are also expressly incorporated by reference herein.

Block copolymer compatibilizers of this nature are commercially available, for example, "Stereon 840" (sold by Firestone Synthetic Rubber and Latex Co. Akron, Ohio), having a melt index of 1.5–3.5 (Condition E) and 10–15 (Condition G) and containing 43% bound styrene, and the thermoplastic styrene block copolymer rubbers such as the SBS (styrene-butadiene-styrene) block copolymers sold by the Shell Chemical Company under the trademarks "Kraton 2103," "Kraton 2104" and "Kraton 2113." Such thermoplastic rubbery block copolymers are made anionically and are commercially available in the form of pellets. Compression molded samples of "Kraton 2103" at 74° F. have a shore A hardness of 62, a tensile strength of 4,300 psi, 300% modulus of 400 psi, elongation of 880% and a specific gravity of 0.94. Basically, the various Shell Kratons such as "Kraton 2103", "Kraton 2104" and "Kraton 2113" differ in molecular weight and viscosity and also in the ratio of butadiene to styrene. For example, "Kraton 2103" and "Kraton 2113" have a styrene to butadiene ratio of 28:72, while "Kraton 2104" has a styrene to butadiene ratio of 30:70.

The preferred compatibilizers used in the present invention have a "softness" parameter of greater than about 200 psi in terms of the 300% modulus and a melt viscosity (melt index) of less than about 22 grams/10 min. under Condition G (ASTM Test D1238-73) to as compositions of the invention is quite attractive, being somewhat pearlescent or semi-translucent in thin-walled articles.

A further advantage of the compositions of the invention is that they can be recycled several times in the conventional procedure whereby the scrap is comminuted and dry-blended or extrusion-blended with fresh virgin material. This is a particularly valuable advantage for high volume production operations.

The low temperature impact strength of materials made from the polymer blend compositions of the invention is greatly improved as compared to the typical performance of certain olefin polymers themselves, such as polypropylene, thus providing the required low temperature impact performance and other physical characteristics required for many applications for which such polyolefins could not be used. In fact, in order to provide such characteristics, it has been necessary in the past to use the modified styrene polymers known as high impact polystyrene, or other more expensive polyolefin copolymeric materials. In addition, the compositions of the invention have excellent food, oil and fat resistance and are thus especially suited for packaging food products. The polymer blends of the invention can thus be readily formed into packages, containers, lids, cups, dinnerware and other products having wall thicknesses varying from very thin (for example, about 4 mils or less) to very thick (for example, about 25 mils or more).

In general, it is expected that the conventional thermoforming processes using the polymer blends of the invention will be most commonly carried out on sheets having a thickness of from about 8 to 70 mils. However, it should be noted that some larger products require processing of sheets in the range of 250 mils or more. It is also to be noted that, although the compositions of the invention are most advantageously used in conventional thermoforming operations, they have a variety of improved properties which make them favorable for use in various forming processes such as injection molding. Such blends are also suitable for co-extrusion and foaming with physical or chemical blowing agents. For example, a layer of polystyrene or a polyolefin such as polypropylene may be co-extruded onto the blend. A polystyrene layer of this nature would provide gloss and printability without the need for an interlayer to adhere the polystyrene layer to the blend.

The aforementioned properties are not obtainable by any one of the three blend components alone or even by any combination of two of the blend components alone.

The blend compositions of the invention can be characterized as "polymer alloys" since there is sufficient interaction between the various chemical groups thereof. Although the inventors do not wish to be bound by any specific theory as to the precise mechanism by which the invention achieves its results, it is believed that the unique properties of the polymer blends described herein result from the creation of a chemical compatibility between the styrene groups and the olefin groups (or other linear hydrocarbon groups) by the block copolymer compatibilizer.

EXAMPLES OF THE INVENTION

The following Examples are given merely as illustrative of the present invention and are not to be considered as limiting. Unless otherwise noted, the percentages therein and throughout the application are by weight.

The properties described in the Examples were determined in the following manner:

Sheet Impact Strength

The impact strength is determined by use of a falling dart impact tester. A one pound dart with a rounded head (0.133" radius) is used. Twenty-five samples are tested using the staircase method to determine the mean failure height. The samples are supported by a block which has a 1¼" diameter hole in the middle. Knowing the failure height, dart weight and average sheet gauge, the impact strength is calculated in terms of ft.-lb./in. of gauge. Impact strength is determined at room temperature and at −40° F. Samples are left in a freezer at −40° F. for at least 24 hours prior to testing.

Tensile Properties

Basically, the ASTM D638-72 test method is used for determining a material's tensile properties. An Instron Tensile tester is used to test tensile samples cut to Type IV dimensions using a router and a template. Samples are cut from the machine and from the transverse directions of the sheet. Crosshead speed is 2.0 inches per minute.

Stress Crack Resistance

This is a test which is used to determine the resistance that materials may have to fracturing while under stress in a food oil environment. Two tensile samples, cut from the transverse direction, are subjected to a 0.5% strain while coated with margarine (Soft Chiffon Margarine works well) for one hour. The samples are then removed from the strain bar, wiped clean of the margarine and tested as regular tensile samples after allowing them to room condition for one hour. The resultant tensile strength and elongation are compared to control samples and the percent tensile strength and elongation retention are recorded.

Sheet Orientation

The orientation test is a means of determining the amount of residual stress incorporated into the sheet during extrusion. Three samples of known size are cut from the sheet, one from the center and one from each edge of the sheet. The samples are placed in a silicone oil bath at 340° F. for five minutes. The samples are then removed from the bath and are measured for shrinkage or growth in each direction. The results are recorded in +% or −%. The designation "+" means there are growth and the designation "−" means there was shrinkage.

Vicat Softening Point (°F.)

The ASTM D1525-75 test method is used for this property. The rate of temperature rise is 120°±12° C./hr.

Melt Rheology

This test is performed on an Instron Capillary Rheometer. From rheometer tests, the amount of force required to drive a material through a certain size capillary at a given strain rate and temperature can be obtained. The rheology test is most often due at 400° F. Strain rates used for testing are those which most closely duplicate those in typical extrusion operations.

Stiffness

The ASTM D747-70 test method is used. Samples are cut from the sheet in the machine direction.

Density

Method A-1 from the ASTM D792-66 test method is used.

EXAMPLE 1

Pellets of the following components are physically blended in a mixing apparatus:

| | |
|---|---|
| Polypropylene (Exxon 316) | 76% |
| Polystyrene (Styron 484) | 20% |
| Styrene-butadiene-styrene copolymer (Shell "Kraton 2113") | 4% |

The mixture is extruded on a conventional 3½" Welex double-vented extruder with a single stage screw of 32:1 L/D ratio and at a melt temperature of 440° F. The extrudate is passed over chill rolls at about 150° F. to form a sheet. The resulting sheet has the following properties:

| | |
|---|---|
| Sheet thickness | 35 mils |
| Sheet impact strength (68° F.) | 28.8 ft-lbs |
| Sheet impact strength (−40° F.) | 13.5 ft-lbs |
| Tensile strength (psi): | |
| longitudinal | 4060 |
| transverse | 3510 |
| Tensile elongation: | |

|                              |                      |
|------------------------------|----------------------|
| longitudinal                 | 916%                 |
| transverse                   | 62.3%                |
| Sheet orientation            |                      |
| longitudinal                 | −38.5%               |
| transverse                   | +6.3%                |
| Vicat softening point        | 270° F.              |
| Stress crack resistance:     |                      |
| tensile strength retained    | 98.5%                |
| tensile elongation retained  | 100%                 |
| Stiffness                    | $1.31 \times 10^5$ psi |

The sheet is then fed to a thermoforming machine having heaters disposed above and below the sheet where it is heated to its softening point, i.e., the temperature at which it can be thermoformed. The sheet is then intermittently fed to a forming station having molds of a desired cup-like shape, which act upon the thermoformable plastic sheet so as to form the desired configuration. The cups are trimmed from the sheet, rimmed, stacked and packaged.

The trimmed waste is ground and fed back into the mixing apparatus where it is blended with virgin stock material in preparation for the production of additional sheet material.

EXAMPLE 2

Pellets of the following components are physically blended in a mixing apparatus:

| | |
|---|---|
| Polypropylene (Exxon CD 316) | 64% |
| Polystyrene (Dow XP 71005.01) | 30% |
| Styrene-butadiene-styrene block copolymer (Shell "Kraton 2113") | 6% |

The mixture is extruded on a 4½" NRM extruder with the barrel zones set at 420° to 450° F. and the die zones set at 450° F. A sheet consisting of the polymer blend is produced with the extruder running at 127 rpm.

The sheet is fed into a Brown Thermoformer apparatus (Model 46P) where the sheet is heated to its thermoforming temperature. From there the sheet is advanced to a molding machine where cups are formed at commercial rates. The resulting cups are trimmed from the sheet, rimmed and stacked in a conventional manner. The cups are acceptable for consumer use. The trimmed scrap material, amounting to about 50% of the sheet, can be added back to an equal amount of virgin polymer blend to form additional cups or other desired articles.

EXAMPLE 3

A sheet is formed on a 4½" NRM extruder, from a blend of 64% polypropylene (Exxon 316), 30% crystal polystyrene (Dow XP 71005.01) and 6% styrene-butadiene-styrene block copolymer (Shell "Kraton 2113") with the barrel and die zones set at 450° F. as described in Example 2. The sheet is run over chrome rolls at 62.5 feet/minute at a temperature on the top roll of 150° F., a temperature of 134° F. on the middle roll and a temperature of 130° F. on the bottom roll. The sheet produced is excellent in appearance with a similarity to a polystyrene sheet.

The sheet is introduced into a Brown Thermoformer 46P with the temperature of the various heaters therein set at from 900° to 1430° F. and formed into lids at a rate equal to that employed for polystyrene in a normal commercial process. The resulting lids are excellent in appearance and detail.

The formed sheet is then inserted into a trim press, and the lids are punched out of the formed sheet.

Commercially acceptable lids can be formed from 50% sheet scrap and 50% virgin polymer blend.

EXAMPLE 4

Pellets of the following components are physically blended in a mixing apparatus:

| | |
|---|---|
| Polypropylene (Exxon 598A) | 64% |
| Polystyrene (Dow XP 71005.01) | 30% |
| Styrene-butadiene-styrene block copolymer (Shell "Kraton 2103") | 6% |

The mixture is extruded on a 6" NRM extruder having an L/D ratio of 24:1 with the barrel zones set at 415° to 450° F. and the die zones set at 450° F. Sheet is formed with the extruder running at 65 rpm.

The sheet is fed through a Bellaplast thermoformer and yogurt containers are formed at close to the commercial rate normally employed for impact polystyrene. The Bellaplast is a different type of thermoforming system than the Brown system in that the Brown system extrudes, cools the sheet, then re-heats the sheet in an oven and forms the finished product. The Bellaplast system extrudes the sheet through rolls which condition the sheet to the correct temperature and then form the finished product.

The resulting containers have excellent detail. The formed sheet is then put through the trim press and the containers are punched out therefrom. The containers are rimmed and then subsequently printed. The printing is satisfactory, but, if desired, flame treatment may be used to adhere the print to the container more securely.

Containers were successfully made with 50% virgin resin blend and 50% regrind.

Containers could not be made successfully when the procedure was repeated using polypropylene sheet material.

EXAMPLE 5

The procedure of Example 4 is repeated except that a co-extruded layer of general purpose crystal polystyrene (Monsanto HF777) is extruded onto the surface of the sheet formed from the polymer blend. The co-extruded sheet is fed through the Bellaplast thermoformer, thereby resulting in the formation of cups having excellent detail. The cups are then trimmed, rimmed and printed.

EXAMPLE 6

The procedure of Example 5 is repeated using impact polystyrene (Dow 412D) as the co-extruded layer to provide commercially acceptable cups.

EXAMPLE 7

Example 1 is repeated using polyethylene (Dow 550) instead of polypropylene in the formulation. The thermoformed cups are of excellent quality.

EXAMPLE 8

Example 7 is repeated with a layer of crystal polystyrene (Monsanto 777) co-extruded thereon as the skin. Again, the cups are of good quality.

EXAMPLES 9-17

Polymer blends having the following formulations are extruded into sheet material and subsequently thermoformed into acceptable containers having a desired shape in the manner described in Example 1:

| | | |
|---|---|---|
| (9) | Polypropylene | 68% |
| | Polystyrene | 30% |
| | Styrene-butadiene-styrene block copolymer (Shell "Kraton 2103") | 2% |
| (10) | Polypropylene | 66% |
| | Polystyrene | 30% |
| | Styrene-butadiene-styrene block copolymer (Shell "Kraton 2103") | 4% |
| (11) | Polypropylene | 64% |
| | Polystyrene | 30% |
| | Styrene-butadiene-styrene block copolymer (Shell "Kraton 2103") | 6% |
| (12) | Polypropylene | 62% |
| | Polystyrene | 30% |
| | Styrene-butadiene-styrene block copolymer (Shell "Kraton 2103") | 8% |
| (13) | Polypropylene | 60% |
| | Polystyrene | 30% |
| | Styrene-butadiene-styrene block copolymer (Shell "Kraton 2103") | 10% |
| (14) | Polypropylene | 66% |
| | Polystyrene | 30% |
| | Styrene-butadiene-styrene block copolymer (Shell "Kraton 2113") | 4% |
| (15) | Polypropylene | 64% |
| | Polystyrene | 30% |
| | Styrene-butadiene-styrene block copolymer (Shell "Kraton 2113") | 6% |
| (16) | Polypropylene | 78% |
| | Polystyrene | 20% |
| | Styrene-butadiene-styrene block copolymer (Shell "Kraton 2113") | 2% |
| (17) | Polypropylene | 76% |
| | Polystyrene | 30% |
| | Styrene-butadiene-styrene block copolymer (Shell "Kraton 2113") | 4% |

EXAMPLES 18-35

Sheets prepared from blends of polypropylene with general purpose polystyrene or impact polystyrene and 0 to 20% compatibilizer in accordance with the procedure set forth in Example 1 displayed the physical properties shown in the following Table. This Table does not include all possible variations but is merely representative.

POLYMER BLEND SHEET PROPERTIES
Sheets Prepared as Per Example 1

| EXAMPLES | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|
| % Impact Polystyrene Dow Stryon 484 | 20 | 20 | 20 | 20 | | | | | | | | | | 100 | | 30 | | |
| % Polystyrene Dow 71005.01 | | | | | 30 | 30 | 30 | 30 | | 30 | 30 | 30 | 30 | | 100 | | | 30 |
| % Polystyrene Monsanto HH103 | | | | | | | | | 30 | | | | | | | | | |
| % Polypropylene Exxon CD316 | 80 | 78 | 76 | 74 | | | | | | | | | | | | 100 | 64 | |
| % Polypropylene Exxon 598A | | | | | 70 | 68 | 66 | 64 | 64 | 62 | 60 | 55 | 50 | | | | | 60 |
| % Compatibilizer Shell Kraton 2113 | 0 | 2 | 4 | 6 | | | | | | | | | | | | | | |
| % Compatibilizer Shell Kraton 2103 | | | | | 0 | 2 | 4 | 6 | 6 | 8 | 10 | 15 | 20 | | | | | |
| % Compatibilizer Shell Kraton 2104 | | | | | | | | | | | | | | | | | 6 | 10 |
| Impact Strength (ft-lb/in) | | | | | | | | | | | | | | | | | | |
| Room Temperature | 5.1 | 20.9 | 23.8 | 25.6 | 0.9 | 6.1 | 5.9 | 19.4 | 26.8 | 24.2 | 25.4 | 43.0 | 47.1 | 40.1 | <.3 | 29.4 | 11.2 | 11.6 |
| −40° F. | <2.3 | 7.1 | 5.3 | 9.5 | <0.3 | 0.8 | 1.1 | 7.9 | 15.5 | 17.2 | 16.0 | 36.9 | 39.4 | 40.5 | <.3 | 1.1 | 0.8 | 3.3 |
| Tensile Strength (psi) | | | | | | | | | | | | | | | | | | |
| Machine Direction | 4,017 | 4,020 | 4,288 | 4,373 | | | | 4,585 | 4,531 | | | | | 3,423 | | 5,116 | | |
| Transverse Direction | 3,369 | 3,370 | 3,581 | 3,470 | | | | 3,718 | 3,577 | | | | | 3,247 | | 5,238 | | |
| Tensile Elongation (%) | | | | | | | | | | | | | | | | | | |
| Machine Direction | 1,111 | 414 | 924 | 586 | | | | 78 | 149 | | | | | 122 | | 1,122 | | |
| Transverse Direction | 78 | 29 | 188 | 88 | | | | 34 | 54 | | | | | 91 | | 1,122 | | |
| Stress Crack Resistance | | | | | | | | | | | | | | | | | | |
| % Tensile Strength Retained | 100 | 100 | 100 | 99 | | | | 100 | 100 | | | | | 55 | | 99 | | |
| % Tensile Elongation Retained | 24 | 100 | 100 | 93 | | | | 100 | 100 | | | | | 3 | | 100 | | |
| Vicat Softening Temperature (°F.) | 268 | 277 | 275 | 272 | | | | 239 | 248 | | | | | 210 | | 291 | | |
| Stiffness (psi × 10$^{-5}$) | | | | 1.13 | | | | 1.75 | 1.78 | | | | | 2.12 | | 2.00 | | |

As can be seen by referring to the above Table, Examples 31, 32 and 33, which utilize either 100% polystyrene or 100% polypropylene provide a product which does not possess all of the beneficial properties such as good low temperature impact strength, high Vicat softening point, good thermoformability and excellent fat resistance as is achieved by the polymer blends of the present invention. For example, the low temperature impact strength of 100% polystyrene (Example 32) or 100% polypropylene (Example 33) is quite low. In Example 31, wherein 100% impact polystyrene was used, the stress crack resistance is undesirable.

Examples 18 and 22 show that blends of polystyrene and polypropylene per se are generally not sufficiently compatible to attain the advantages of the present invention. Thus, it is not until an effective amount of a suitable compatibilizer is utilized, as typified by Examples 19–21, 25 and 26, that the advantageous features of the present invention are achieved. As the Table demonstrates, the amount of compatibilizer may vary depending on the particular compositions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A thermoformable polymer blend composition comprising about 54 to 82% by weight of olefin polymer, about 15 to 40% by weight of styrene polymer and about 2 to 10% by weight of a thermoplastic styrene-butadiene-styrene block copolymer rubber compatibilizer, said compatibilizer having a softness parameter of greater than about 200 psi in terms of the 300% modulus and a melt index of about 1.4 to about 22 grams/10 min. under Condition G of ASTM Test D 1238-73.

2. A polymer blend composition according to claim 1, wherein said blend comprises about 54 to 82% by weight of polypropylene.

3. A polymer blend composition according to claim 1, wherein said blend comprises about 54 to 82% by weight of polyethylene.

4. A polymer blend composition according to claim 1, wherein said styrene polymer is general purpose polystyrene or impact polystyrene.

5. A polymer blend composition according to claim 1, wherein said styrene polymer is an acrylonitrile-butadiene-styrene copolymer.

6. A polymer blend composition according to claim 1, wherein said styrene polymer is a styrene-acrylonitrile copolymer.

* * * * *